Figures 1, 2:
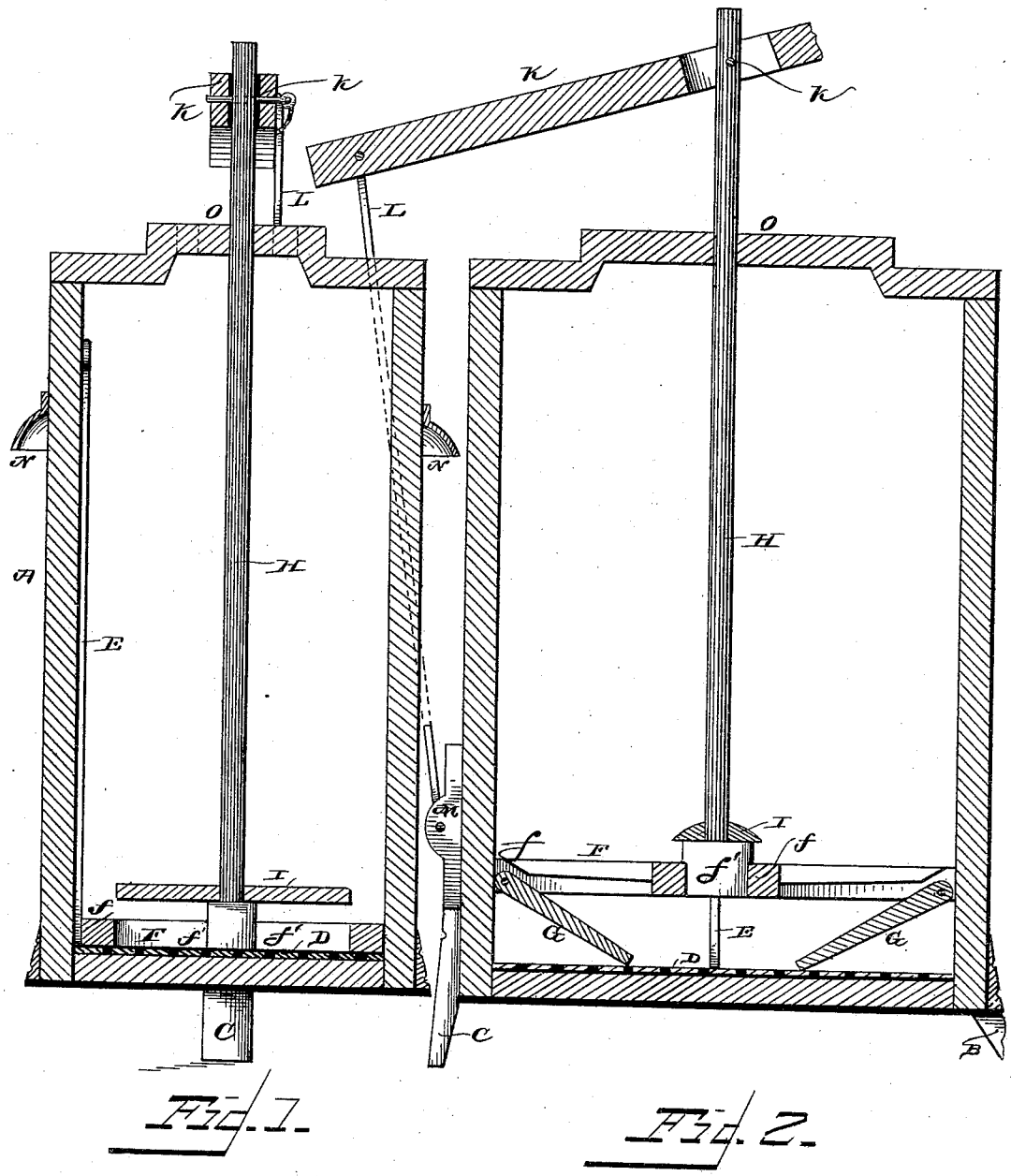

(No Model.)

J. W. HELDRETH.
CHURN.

No. 322,058. Patented July 14, 1885.

WITNESSES
O. W. Dashiell
E. G. Siggers

INVENTOR
Joseph W. Heldreth
By, C. A. Snow & Co.
Attorneys

UNITED STATES PATENT OFFICE.

JOSEPH WENTON HELDRETH, OF PATTONSBURG, MISSOURI, ASSIGNOR OF ONE-HALF TO N. G. DILLON, OF SAME PLACE.

CHURN.

SPECIFICATION forming part of Letters Patent No. 322,058, dated July 14, 1885.

Application filed March 24, 1885. (No model.)

*To all whom it may concern:*

Be it known that I, JOSEPH W. HELDRETH, a citizen of the United States, residing at Pattonsburg, in the county of Daviess and State of Missouri, have invented a new and useful Improvement in Churns, of which the following is a specification, reference being had to the accompanying drawings.

My invention relates to an improvement in churns; and it consists in the peculiar construction and combination of devices that will be more fully set forth hereinafter, and particularly pointed out in the claims.

In the accompanying drawings, Figure 1 is a vertical longitudinal sectional view of a churn embodying my improvements. Figure 2 is a transverse vertical sectional view of the same.

A represents the churn-body, which is preferably rectangular in shape, as shown, and which is supported upon the legs B C. The front legs, B, are secured to the churn-body at an angle and project beyond the front side of the churn. The rear leg, C, is secured to the rear side of the churn-body. In the bottom of the churn is placed a strainer, D, from one side of which extends a vertical rod, E, which bears against one side of the churn-body and extends nearly to the top thereof.

F represents the churn-dasher, which fits snugly in the churn-body. This dasher consists of the rectangular frame $f$, which has an opening, $f'$, in the center. In the outer ends of the frame are pivoted the downwardly-opening valves G. From the center of the frame rises the vertical dasher-rod H, to which, at a slight distance above the dasher, is secured a wing, I, that extends over the opening $f'$.

K represents a hand-lever that is fulcrumed to the upper end of the dasher-rod, as at $k$. The rear end of this hand-lever is pivoted to a rod, L, that has its lower end pivoted in a bracket, M, that is secured to the rear side of the churn-body near the lower end thereof. Handles N are attached to the sides of the churn, and a cover, O, is provided for it. The cover is provided with a central opening, through which extends the dasher-rod. When the lever K is raised, the dasher is moved upwardly through the cream in the churn, and when the dasher is forced down in the churn the valves close and the cream is forced violently up through the central opening in the dasher and dashed against the extending wing. This movement of the dasher turns the cream into butter in a very short time. When the butter has been churned, the cover is taken off and the dasher removed from the churn. In order to remove the butter from the churn it is only necessary to raise the strainer D by the rod E. As the strainer is raised the butter is strained and only the buttermilk is left in the churn.

A churn embodying my improvements is simple and cheap, is very easily operated, and is very rapid and efficient in its operation.

I am aware that it has been heretofore proposed to construct a churn-dasher with a central opening and downwardly-opening hinged valves, and this, broadly, I disclaim. I am also aware that it has been heretofore proposed to construct a churn-dasher with a central opening and an extended wing or deflecting board over said opening, and this also, broadly, I disclaim. Without the wing which extends over the central opening the cream would have to be churned merely by friction with the sides of said opening, which would be a very slow and laborious operation. The downwardly-opening valves permit the dasher to rise freely up through the cream with very little friction therewith, and this is further facilitated by rounding off the upper side of the wing, as shown at Fig. 2. When the dasher is forced downwardly, the valves close and force the cream in a stream violently up through the central opening where it is dashed against the extended wing, and the friction with the flat under side thus generated converts the cream into butter in a very short time. This construction thus has superior advantages over either of the constructions hereinbefore disclaimed, as will be very readily understood.

Having thus described my invention, I claim—

1. The dasher having the central opening, the wing above the central opening, and the downwardly-opening valves, substantially as described.

2. The churn-dasher consisting of the frame $f$, having the central opening, $f'$, the downwardly-opening valves G, hinged at their outer edges in the outer sides of the frame $f$ for forcing the cream up through the central opening as the dasher descends, and the extended wing I, secured to the dasher-rod in the center of the opening $f'$, said wing extending over said opening above the frame for deflecting the cream as it rushes through the opening $f'$, the upper side of said wing being rounded, for the purpose set forth, substantially as described.

In testimony that I claim the foregoing as my own, I have hereto affixed my signature in presence of two witnesses.

JOSEPH WENTON HELDRETH.

Witnesses:
CHAS. E. HILL,
JAMES B. GARSUCH.